Patented Sept. 28, 1948

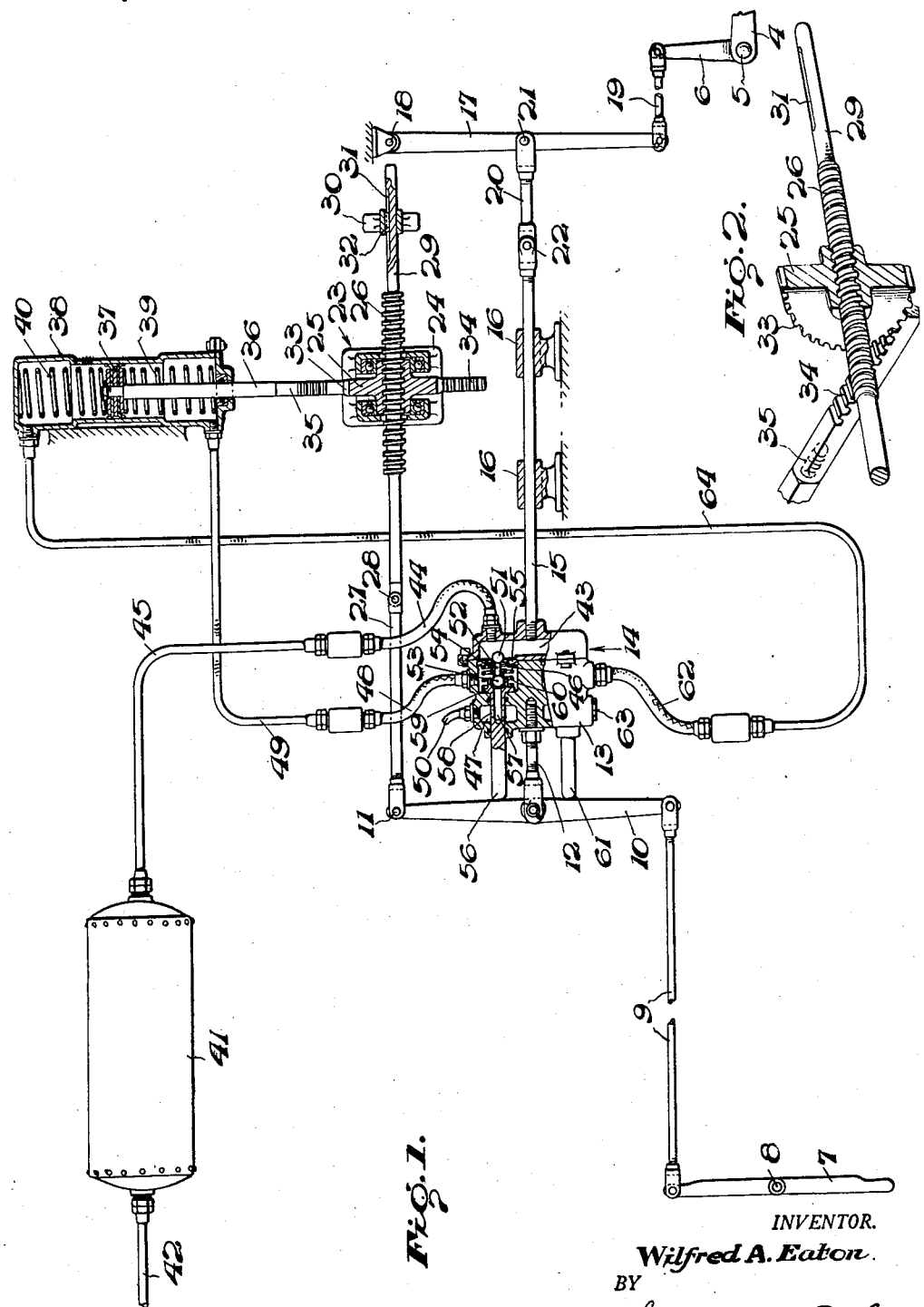

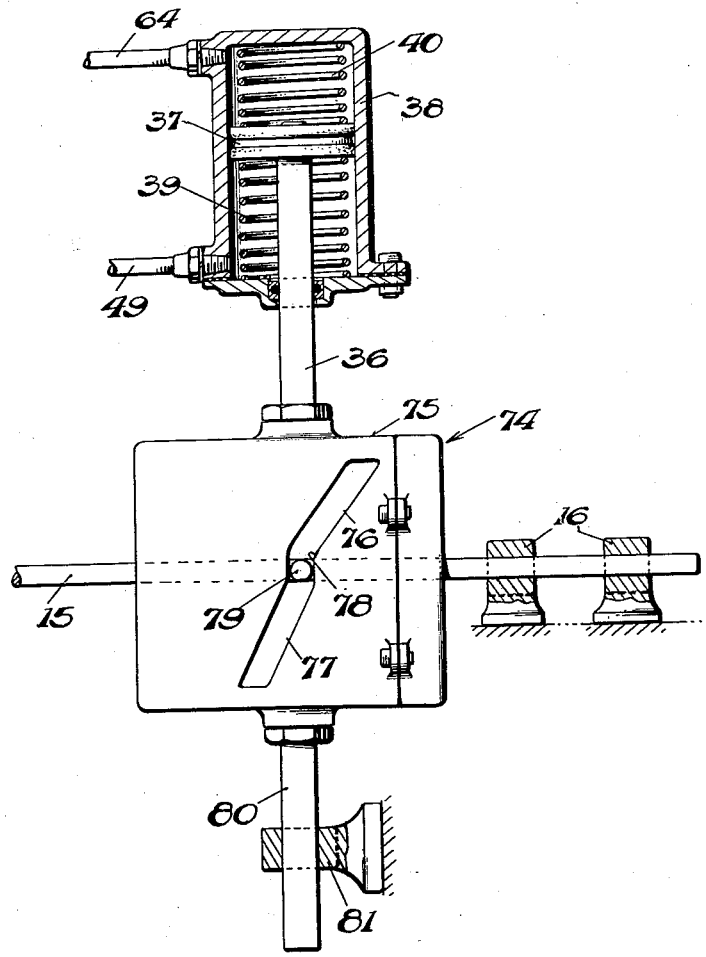

2,450,274

UNITED STATES PATENT OFFICE 2,450,274

PRESSURE FLUID FOLLOW-UP SERVOMOTOR

Wilfred A. Eaton, Elyria, Ohio, assignor to Bendix-Westinghouse Automotive Air Brake Company, Elyria, Ohio, a corporation of Delaware Application May 12, 1944, Serial No. 535,301

17 Claims. (Cl. 121—41)

This invention relates to control mechanism, and more particularly to fluid pressure control mechanism for controlling the operation of a rudder or other control surface of an airplane.

It has previously been proposed to provide combined manual and power operated means for controlling the operation of rudders and other control surfaces of airplanes, but difficulty has been experienced in connection with many of these symptoms due to the fact that the lost motion connection required to operate the necessary control valves has resulted in an undesirable slack between the operator's control lever and the control surface which has rendered it difficult for the operator to exercise a fine and delicate control of the surfaces, and it is accordingly one of the objects of the present invention to provide manual and power operated control mechanism for such a surface, so constituted as to eliminate this difficulty.

Another object of the invention is to provide a manually operable control for directly controlling the rudder of an airplane, together with power operated means controlled by the operation of the lever for moving the lever in order to effect power operation of the rudder.

Yet another object of the invention is to provide, in a control system of the above type, a normally immovable fulcrum for an operator's control lever connected directly with the rudder or other control surface, together with power operated means controlled by operation of the lever for moving the fulcrum in order to effect power operation of the control surface.

A still further object of the invention is to provide combined power and manually operable means for controlling the rudder of an airplane so constituted as to permit direct manual operation of the rudder by the operator in the event of failure of the power means.

These and other desirable objects and features of the invention will be more readily apparent to those skilled in the art when considered in the light of the following description, but it is to be expressly understood that the description is not to be taken as limiting the invention, reference being had for this purpose to the appended claims.

In the drawings, wherein similar reference characters are utilized in the several views;

Fig. 1 is a diagrammatic illustration, partially in section, of a fluid pressure control system for controlling the operation of an airplane rudder or other remotely situated device;

Fig. 2 is a detailed view, partially in section, of a portion of the above mechanism; and Fig. 3 is a partial view showing another embodiment of the invention.

The system is illustrated generally in Fig. 1 as including an airplane rudder 4, or other device adapted to be remotely controlled, the rudder being pivotally mounted on the airplane, not shown, by means of a suitable shaft 5, and provided with an operating lever 6. A pilot's rudder bar 7 is pivotally mounted on the airplane by means of a pivot pin 8, and is provided with a direct mechanical connection with the lever 6 through the medium of a rod 9 pivotally connected at the left end to the rudder bar 7 and at the right end to an operating lever 10 having a fulcrum 11. The lever 10 is also provided with a rod 12 pivotally connected thereto intermediate the fulcrum 11 and the rod 9, and connected at its right end to casing 13 of a control valve mechanism 14, to be more fully described hereinafter, the right end of the casing being connected to a rod 15 slidably mounted on suitable bearing brackets 16 as shown. A transfer lever 17 is fulcrumed on the airplane structure by means of a suitable pivot pin 18, and is connected at its lower end with the lever 6 by means of a connecting rod 19, the central portion of the lever being connected to the right end of the rod 15 by means of a connecting rod 20 pivotally connected to the lever and the rod 15 by means of pivot pins 21 and 22. In order that direct mechanical operation of the rudder may be obtained on movement of the rudder bar 7 about the pivot pin 8, the fulcrum 11 of the lever 10 is normally maintained against movement in either direction by means of a mechanism 23, this mechanism including a casing 24 having a nut 25 mounted for rotation therein and a worm 26 threadedly received by the nut, the left end of the worm being connected with the fulcrum 11 by means of a connecting rod 27 pivotally connected to the worm by means of a pin 28. A reduced portion 29 at the right end of the worm is guided by longitudinal movement in a suitable bracket 30, rotation of the worm in the bracket being prevented by means of a keyway 31 formed in the extension 29 and in engagement with a key 32 carried by the bracket. The threads of the worm nut are so constituted as to be irreversible, the result being that on operation of the rudder bar to turn the rudder through the connecting means above described, the longitudinal force exerted on the worm by the lever 10 through the fulcrum 11, the rod 27, and the pivot pin 28, will not serve to effect rotation of the nut 25 regardless of the degree of force exerted on the lever 10 for the purpose of moving the rudder. It thus appears from the foregoing that the rudder bar is at all times directly and non-yieldingly connected with the rudder, and that operation of the rudder bar will result in corresponding movement of the rudder without any lost motion occurring between the rudder and rudder bar except that which is inherent in the pivotal connections above described.

In order that the rudder bar may occupy the same position at all times when the rudder is in neutral position, it is apparent that it is desirable to provide means for positioning the worm 26 for the purpose of normally maintaining the fulcrum 11 in the position shown, and to this end the outer periphery of the nut 25 is provided with gear teeth 33 which are in engagement at all times with corresponding gear teeth 34 on a rack 35. The rack is provided at its upper end with a piston 37 slidably mounted in an air cylinder 38, and the piston is normally maintained in the position shown by means of opposed springs 39 and 40 which are interposed between the opposite sides of the pistons and the corresponding ends of the cylinder. It will be understood that these springs may be precompressed or preloaded to any desired degree in order to insure maintenance of the piston in the position shown under ordinary conditions of operation.

Means are provided for controlling the energization of the fluid motor or cylinder 38 in order to move the piston in one direction or the other from the position shown, and to this end, a fluid pressure reservoir 41 is provided, this reservoir being adapted to receive fluid pressure from a compressor, not shown, through a conduit 42. The valve mechanism 14 is provided with an inlet chamber 43, and this chamber is connected with the reservoir 41 through a flexible hose 44 and a conduit 45. The valve mechanism 14 is of the so-called duplex type, and since the upper portion of the valve mechanism, shown in Fig. 1, is identical with the portion in the lower half of the valve mechanism, the upper portion only will be described. The casing 13 is provided with an outlet chamber 46 and an exhaust chamber 47, the outlet chamber being connected with the lower end of the cylinder 38 by means of a flexible hose 48 and a conduit 49, and the exhaust chamber being connected with atmosphere by means of an exhaust conduit 50. Communication between the inlet chamber and the outlet chamber is normally prevented by means of an inlet valve 51, the valve being provided with a stem 52, an exhaust valve 53 mounted on the left end of the stem, and an inlet valve spring 54 positioned between the right side of the exhaust valve and the surface of a ported partition 55 carried by the casing, the spring thus serving to normally maintain the inlet valve in a position to prevent communication between the inlet and outlet chambers. A valve operating element or plunger 56 is slidably mounted in the left end of the casing, a bore 57 in the plunger being connected with the exhaust chamber by means of ports 58 and being connected at its right end with the outlet chamber 46. The plunger is provided at its right end with a shoulder 59 which serves to limit leftward movement of the element, movement of the element to the right being opposed by means of a spring 60 interposed between the right side of the shoulder and the partition 55. The parts are so dimensioned that with the plunger in the position shown, the inlet valve is maintained in closed position by means of the inlet valve spring 54, while the right end of the bore 57 is spaced from the left surface of the exhaust valve 53 in order to permit communication between the outlet chamber 46 and atmosphere through the bore 57, the ports 58, the exhaust chamber 47 and the exhaust conduit 50. Thus on movement to the right, the plunger 56 first contacts the exhaust valve in order to close the right end of the bore 57 to prevent communication between the outlet chamber and atmosphere, and serves on further movement to open the inlet valve in order to permit the flow of fluid pressure from the inlet chamber to the outlet chamber and thence to the lower end of the cylinder 38 through the flexible hose 48 and the conduit 49. The lower portion of the valve is provided with a corresponding valve operating element or plunger 61, and it will be understood from the foregoing description that with the plunger 61 in the position shown, the lower portion of the valve mechanism serves to prevent communication between the inlet chamber 43 and an outlet hose 62 connected to the casing, and at the same time serves to permit communication between the hose 62 and an exhaust port 63 formed in the casing, movement of the plunger to the right serving to prevent communication between hose 62 and the port 63 and to permit communication between the inlet chamber 43 and the flexible hose. Since the flexible hose 62 is connected to the upper end of the cylinder 38 by means of a conduit 64, it will be understood that the lower portion of the valve mechanism controls the pressure of fluid in the cylinder 38 above the piston 37, while the upper portion of the valve mechanism controls the pressure in the cylinder below the piston.

Assuming that it is desired to turn the rudder 7 in a counterclockwise direction about the pivot pin 8, it will be understood that the rod 9 will move to the left, and that the lever 10 will tend to rotate in a clockwise direction about the fulcrum 11, with resultant movement of the rod 12, the valve mechanism 14, the rod 15 and the rod 20 to the left. Since the rod 20 is connected to the lever 17, the latter will likewise rotate in a clockwise direction about the pivot pin 18 in order to impart counterclockwise rotation to the rudder 4 due to the fact that the lower end of the lever is connected with the lever 6 on the rudder by means of the connecting rod 19. As heretofore stated, the threads on the worm 26 and the nut 25 are irreversible, and consequently no movement of the fulcrum 11 to the right will take place during the above type of operation. In view of the fact that the valve mechanism 14 is mounted on the rod 15, which in turn is guided for longitudinal movement by means of the brackets 16, the angle between the lever 10 and the rod 12 will change and the valve operating element 56 will be moved to the right with respect to the valve casing 13, this movement serving to first operate the valves to prevent communication between the outlet chamber 46 and atmosphere, and thereafter to open the inlet valve 51 in order to permit the flow of fluid pressure from the reservoir 41 to the inlet end of the cylinder 38 through conduit 45, flexible hose 44, inlet chamber 43, outlet chamber 46, flexible hose 48 and conduit 49. The fluid pressure is thus supplied to the lower end of the cylinder 38 which is suitably maintained against movement on the structure of the airplane, with the result that the nut 25 will be rotated by the teeth of the rack 35 in order to move the worm 26 to the left with respect to the mechanism 23, this latter mechanism likewise being suitably mounted against movement on the structure of the airplane. Since the left end of the worm 26 is connected with the lever 10 at the fulcrum 11, by means of the pivotally connected rod 27, the fulcrum 11 will likewise be moved to and the lever 10 will pivot about its connection with rod 9, the left, the tendency thus being for the movement of the fulcrum by the worm 26 to compensate for the angularity between the lever 10 and the rod 12. When this action occurs, the plunger 56 will again be moved to the left under the action of the spring 60 and the fluid pressure in the outlet chamber 46, thus tending to lap the valves 51 and 53 in order to prevent the further flow of fluid pressure to the lower end of the cylinder 38. It will also be apparent that in the event an excess of fluid pressure has been supplied to the lower end of the cylinder 38, the nut and worm will be operated to correspondingly move the fulcrum 11 to the left sufficiently to permit the plunger 56 to operate the valve mechanism to open the exhaust valve 53 in order to release the excess fluid pressure from the cylinder. Thus initial operation of the rudder on movement of the rudder bar 7 is entirely manual through direct mechanical connections, and this movement is assisted by the power supplied by the cylinder 38 as soon as the angularity between the lever 10 and the rod 12 has changed sufficiently to permit operation of the plungers 56 and 61 to supply fluid pressure to the upper and lower ends of the cylinder 38 as the case may be.

It will be readily understood from the foregoing description that the above control system is self-lapping or self-compensating, and assuming that the rudder bar has been turned through a predetermined angle in order to move the rudder from neutral position, it will be clear that in the event the operator releases the force being applied to maintain the rudder bar in the above position, any force exerted on the rudder tending to return it to neutral position, will move the valve mechanism in such a manner as to operate the plungers 56 and 61 to effect the exhaust of fluid pressure from the cylinder 38 in order to permit the return of the piston 37 to its neutral position under the action of the springs 39 and 40. During power operation, and when the rudder bar is maintained in any desired position by the operator, it will be seen that the force exerted on the rod 15 to operate the rudder will be the sum of the forces exerted on the fulcrum 11 by the operation of the cylinder 38 and the mechanism 23 and on the rod 9 by the operation of the rudder bar, and that the ratio of the latter forces will be inversely proportional to the lengths of the upper and lower arms of lever 10. In the event of failure of the fluid pressure system due to breakage of a conduit or to the inoperativeness of the valve mechanism, the fulcrum 11 will be maintained in the position shown by means of the mechanism 23, the rod 36, the piston 37 and the springs 39 and 40, and the operator will be free to effect direct mechanical operation of the rudder without lost motion through the connections described.

A modification of the invention is illustrated in Fig. 3, wherein the mechanism 23 is replaced by a mechanism 74 which includes a cam member 75 attached to the piston rod 36 of the cylinder 38 for movement therewith in the same manner as the rack 35. The cam member 75 is provided with angular slots 76 and 77, these slots being connected by means of a slot 78 formed at right angles to the connecting rod 15, which is slidably mounted in brackets 16 in the same manner as shown in Fig. 1. The rod 15 is provided with a pin 79 adapted to engage the cam slots, and the cam is guided for movement with the piston rod 36 at right angles to the rod 15 by means of an extension 80 slidably mounted in a bracket 81 carried on the structure of the airplane. With the piston 37 maintained in neutral position by the spring 39 and 40, the pin 79 is so positioned as to engage the central portion of the slot 78, and since this slot is formed at right angles to the rod 15, it will be apparent that no movement of the fulcrum 11 will occur on initial operation of the rudder bar 7 to neutral position to operate the rudder, regardless of the degree of force exerted on the rudder bar. As soon as the lever 10 has been operated through a sufficient angle about the fulcrum 11 to operate the plunger 56, for example, in order to operate the valve mechanism to supply fluid pressure from the reservoir to the lower end of the cylinder 38, it will be understood that the piston 37 will be moved upward against the force exerted by the spring 40, and that the corresponding upward movement of the cam member 75 will cause the pin 79 on the rod 15 to engage the angular slot 77, whereupon the pin and the rod 15 will be moved to the left in order to effect corresponding movement of the fulcrum 11 to the left in order to effect lapping of the upper valve mechanism in the manner already described in connection with the embodiment of the invention shown in Fig. 1. On movement of the rudder bar in the opposite direction, the plunger 61 of the valve mechanism shown in Fig. 1 will be operated, and the lower portion of the valve mechanism will become operative to supply fluid pressure from the reservoir to the upper end of the cylinder. When this occurs, the piston 37 will be forced downward with resultant downward movement of the cam member 75, and on engagement of the pin 79 with the angular slot 76, the rod 15 will be moved to the right in order to move the fulcrum 11 in the same direction for the purpose of assisting in the movement of the rudder 4 and for effecting lapping of the valve mechanism. While the principle of operation is substantially the same as that illustrated in connection with Fig. 1, it will be understood that the construction shown in Fig. 3 may be advantageous in some cases in view of the fact that proper design of the angular cam slots 76 and 77 will permit the use of a cylinder having a much shorter stroke than would be necessary in the construction shown in Fig. 1. At the same time, the use of the straight cam slot 78 provides a mechanism which is irreversible in neutral to permit direct mechanical operation of the rudder by the operator on failure of the fluid pressure system without the introduction of any unnecessary lost motion or slack in the connecting mechanism which might otherwise be required to effect operation and lapping of the control valves.

While two embodiments of the invention have been illustrated and described herein with considerable particularity, it is to be expressly understood that same is not limited to the form shown but may receive a variety of mechanical expressions as will appear more readily to those skilled in the art. Reference will, therefore, be had to the appended claims for a definition of the limits of the invention.

What is claimed is:

1. Control mechanism for a device to be actuated including a lever having a direct operating connection with said device, a fulcrum for said lever spaced from said connection, means for normally maintaining said fulcrum in a predetermined position regardless of the force exerted thereon by said lever, and means separate from the first means and including a power actuator controlled by movement of said lever about said fulcrum for moving said fulcrum and lever to effect power operation of said device.

2. Control mechanism for a device to be actuated including a lever having a direct operating connection with said device, a fulcrum for said lever spaced from said connection, means for normally maintaining said fulcrum in a predetermined position regardless of the force exerted thereon by said lever, a power actuator for operating said maintaining means to move the fulcrum to other positions, and means separate from the first means and controlled by movement of said lever about said fulcrum to operate said device for controlling the energization of said power actuator.

3. Control mechanism for a device to be actuated including a lever having a direct operating connection with said device, a fulcrum for said lever spaced from said connection, means for preventing displacement of said fulcrum by operation of said lever, a fluid motor for operating said preventing means to effect movement of said fulcrum, and means separate from the preventing means and including valvular means controlled by movement of said lever about said fulcrum to operate said device for controlling the supply of fluid pressure to said motor.

4. Control mechanism for a device to be actuated including a lever having a direct operating connection with the device, a fulcrum for said lever spaced from said connection, means for controlling the movement of said fulcrum including a power actuator and irreversible force transmitting means interposed between said fulcrum and actuator for preventing movement of said fulcrum by the lever and for moving said fulcrum in response to the application of power to said actuator, and means separate from the first means and controlled by movement of said lever about said fulcrum to operate said device for controlling the supply of power to said actuator.

5. Control mechanism for a device to be actuated including a lever having a direct operating connection with said device, a fulcrum for said lever spaced from said connection, means for controlling the movement of said fulcrum including a power actuator and irreversible force transmitting means interposed between said fulcrum and actuator for preventing movement of said fulcrum by the lever and for moving the fulcrum in response to the application of power to said actuator, and power controlling means separate from the first means and associated with the lever operable on movement of the lever about the fulcrum to energize the actuator and operable on movement of the fulcrum by the operation of the force transmitting means to deenergize the actuator.

6. Control mechanism for a device to be actuated including a fulcrum, a lever mounted for pivotal movement about said fulcrum, means for effecting a direct connection between said device and lever at a point on the lever spaced from said fulcrum, means for preventing displacement of said fulcrum on movement of said lever to move said device through said connection, a power actuator for operating said last named means to displace the fulcrum, and control means carried by said connection means operable by movement of said lever relative thereto for energizing said actuator on movement of said lever about said fulcrum and operable for deenergizing said actuator on movement of the fulcrum by the actuator.

7. Control mechanism for a device to be actuated including a power operated member, a power actuator for operating said member, means connecting said member and actuator for preventing movement of the member except in response to operation of the actuator, a lever having a direct operating connection with the device, a pivotal connection between the lever and member, and means separate from the first means and controlled by movement of said lever about said pivotal connection for energizing and deenergizing said actuator.

8. Control mechanism for a device to be actuated including a power actuated member, a fluid motor for operating said member, a lever having a connection with the member and a connection with the device, power transmitting means connecting said member and motor for moving the member and lever on energization of the motor and for preventing movement of the member by the lever, valvular means separate from the power transmitting means and carried by the connection to the device and movable therewith for controlling the flow of fluid pressure to the motor, and means connecting said lever and valvular means whereby on movement of the lever to move the device the valvular means is operated to supply fluid pressure to the motor to move the member and on movement of the member by the motor is operated to prevent the further flow of fluid pressure to the motor.

9. Control mechanism for a device to be actuated including a movable member, a lever, an operating connection for the device, means for pivotally connecting the lever with the member and with the connection to the device, a fluid motor for moving the member, means connecting said member and motor for moving the member on energization of said motor and for preventing movement of the member by the lever, and valvular means separate from the connecting means and controlled in response to angular movement of the lever about its pivotal connection with the member in a selected direction for supplying fluid pressure to the motor to move the member to effect angular movement of the lever about said pivotal connection in the opposite direction, said angular movement in the opposite direction serving to operate the valvular means to prevent the supplying of fluid pressure to the motor.

10. Control mechanism for a device to be operated including a lever having spaced pivotal connections with manual lever operating means and a power operated member respectively, an operating connection for the device having a pivotal connection with the lever intermediate the first named pivotal connections, a fluid motor for operating the member, irreversible force transmitting means connecting the motor and member for permitting movement of the member by the motor and preventing movement of the member by the lever, and valve means separate from said force transmitting means and operable on movement of the lever about its pivotal connection with the power operated member by the manual operating means for supplying fluid pressure to the motor to move the lever about its pivotal connection with the manual operating means to effect power operation of the lever and operable during the latter movement to cut off the supply of fluid pressure to the motor.

11. Control mechanism for a device to be actuated including valve mechanism having a casing connected with the device, a valve operating lever pivotally mounted on the casing, a power operated member having a pivotal connection with one end of the lever, means for preventing movement of said member by said lever, a fluid motor for operating said preventing means to move the power operated member, and means connected with the other end of the lever for rocking the latter in a selected direction about its pivotal connection with the valve casing for operating the valve mechanism to supply fluid pressure to the motor, the resulting movement of the member by the motor serving to rotate the lever in the reverse direction and operate the valve mechanism to cut off the supply of fluid pressure to the motor, whereby initial manual operation and subsequent power operation of the device is effected.

12. Control mechanism for a device to be actuated including a power actuator, a member for operating the device, and manual operating means, a lever having spaced pivotal connections respectively with said manual operating means, member, and actuator, the last named connection including means for preventing movement thereof by the lever and permitting movement thereof by the actuator, and means separate from said last named connection and controlled by movement of the lever about the connection with the actuator for supplying power to the actuator and controlled by subsequent movement of the lever by the actuator about the pivotal connection with the manual operating means for cutting off the supply of power to the actuator.

13. Control mechanism for a device to be actuated including a power operated member having a neutral position, a power actuator for said member, means connecting said member and actuator for preventing movement of said member except in response to operation by said actuator, resilient means associated with said actuator for normally maintaining the member in said neutral position, a lever having a direct operating connection with the device, a connection between the lever and member, means for moving the lever about said connection with the member, and means separate from the first means and controlled by movement of said lever about the connections with said member and device for energizing and deenergizing said actuator.

14. Control mechanism for a device to be actuated including a power operated member having a neutral position, a fluid motor for moving said member in either direction from neutral position, means connecting said motor and member for preventing movement of the member except by operation of the motor, resilient means for normally maintaining the member in neutral position, and means for operating said device including a lever having a direct connection with the member, a direct connection with the device, and valvular means separate from the first means and associated with said lever and one of said connections operable on movement of the lever about its connection with the member to move the device in a selected direction to supply fluid pressure to the motor for moving the member and lever to effect further movement of the device in said selected direction and operable in response to said movement of the member and lever by the motor to cut off the supply of fluid pressure to the motor.

15. Control mechanism for a device to be actuated including a power operated member having a neutral position, a power actuator for operating said member, means including a cam connecting said actuator and member operable in one position to prevent movement of said member from neutral position and in other positions to move said member from neutral position, a lever for operating said device having a connection with the device and a connection with the member, and means associated with said lever and one of said connections for controlling energization and deenergization of said actuator on movement of said lever relative to said connections.

16. Control mechanism for a device to be actuated including a power operated member having a neutral position, a power actuator for operating said member, means including a cam connecting said actuator and member operable in one position to prevent movement of said member from neutral position and in other positions to move said member from neutral position, resilient means for normally maintaining the cam in said one position, a lever for operating said device having a connection with the device and a connection with the member, and means associated with said lever and one of said connections for controlling energization and deenergization of said actuator on movement of said lever relative to said connections.

17. Control mechanism for a device to be actuated including a power operated member, a fluid motor for operating said member, irreversible force transmitting means for connecting the motor and member including a worm connected with the member and a nut engaging the worm and connected for rotation by the motor, resilient means for normally maintaining the worm and nut in a neutral position, a lever for operating said device having a connection with the device and a connection with the member, and valvular means carried by one of the connections and operated by angular movement of the lever relative thereto for supplying fluid pressure to and releasing fluid pressure from the motor.

WILFRED A. EATON.

REFERENCES CITED

The following references are of record in the file of this patent:

UNITED STATES PATENTS

| Number | Name | Date |
| --- | --- | --- |
| 1,385,658 | Blasiar | July 26, 1921 |
| 1,141,697 | Russell | Dec. 27, 1938 |
| 2,276,418 | Rockwell | Mar. 17, 1942 |
| 2,284,298 | Newton | May 26, 1942 |

FOREIGN PATENTS

| Number | Country | Date |
| --- | --- | --- |
| 488,632 | Germany | Jan. 10, 1930 |